United States Patent [19]

Buckman et al.

[11] 3,856,851

[45] Dec. 24, 1974

[54] POTASSIUM N-HYDROXYLMETHYL-N-METHYLDITHIOCARBAMATE

[75] Inventors: John D. Buckman; John D. Pera, both of Memphis, Tenn.

[73] Assignee: Buckman Laboratories, Inc., Memphis, Tenn.

[22] Filed: Apr. 24, 1972

[21] Appl. No.: 246,961

[52] U.S. Cl.................. 260/513.5, 71/67, 424/286, 260/429 K, 260/429.9, 260/438.1, 260/439 R
[51] Int. Cl.......................................... C07c 125/02
[58] Field of Search.................................. 260/513.5

[56] References Cited
UNITED STATES PATENTS

| | | | |
|---|---|---|---|
| 2,589,209 | 3/1952 | Kardos | 260/513.5 |
| 2,609,389 | 9/1952 | Flenner | 260/513.5 |
| 3,084,095 | 4/1963 | Boogaart | 260/513.5 |

OTHER PUBLICATIONS

Roberts et al., "Basic Principles of Organic Chemistry," W. A. Benjamin, Inc., New York, p. 442, (1965).

*Primary Examiner*—Leon Zitver
*Assistant Examiner*—Nieky Chan
*Attorney, Agent, or Firm*—Floyd E. Trimble

[57] ABSTRACT

Reaction products of alkali-metal salts of dithiocarbamic acid, of N-$C_1$ to $C_5$ alkyl, and N,N'-$C_2$ to $C_4$ alkylenebisdithiocarbamic acids with aldehydes and ammonia or primary amines and diamines are new compounds which are useful as bactericides, fungicides, algicides, nematocides, and soil fumigants in industry and agriculture.

1 Claim, No Drawings

POTASSIUM N-HYDROXYLMETHYL-N-METHYLDITHIOCARBAMATE

This invention relates to novel compositions of matter and the use of the same as bactericides, fungicides, algicides, nematocides, and soil fumigants in industry and agriculture. More particularly, the present invention relates to compounds identified as metal salts of dithiocarbamic acids and their use as pesticides, as previously identified.

The compounds of our invention are characterized as the reaction products of $C_1$ to $C_3$ alkylaldehydes and ammonia, primary $C_1$ to $C_5$ monalkylamines, and primary $C_2$ to $C_4$ alkylenediamines with alkali-metal and alkaline-earth-metal salts of dithiocarbamic acid, of N-$C_1$ to $C_5$ alkyl, and N,N'-$C_2$ to $C_4$ alkylenebisdithiocarbamic acids. The exact structures of these reaction products have not been completely resolved because these reactions result in compounds of limited stability. We have, however, identified as one of the major reaction products the salts of N-$C_1$ to $C_5$ alkyl-N-hydroxymethyl and N,N'-bishydroxymethyl-N,N'-$C_2$ to $C_4$ alkylenebisdithiocarbamic acids.

A great number of dithiocarbamic acid salts have been described in the chemical literature as commercial, industrial, and agricultural microbicides and nematocides. We have discovered that by reacting solutions of well known dithiocarbamic acid salts containing one hydrogen atom attached to the nitrogen of the dithiocarbamate moiety with formaldehyde or lower alkyl aldehydes and ammonia or lower primary alkylamines, we have dramatically increased the effectiveness against microorganisms and nematodes.

The compounds of our invention are useful for slime control in pulp and paper mills, as microbicides and algicides for the treatment of fresh water used in industrial processes, and as microbicides and algicides in cooling towers. The compounds of this invention are useful as agricultural bactericides, fungicides, nematocides, and soil fumigants. In addition, the products are stable in alkaline systems and are, therefore, useful as preservatives for adhesives; caulking, grouting, spackling compounds, and joint cements; detergents; floor wax emulsions and floor polishes; inks; latex emulsions; laundry starch; cutting fluid emulsions; latex paints; coatings, finishes and printing colors based on starch and latex for pulp and paper; and spinning emulsions; finishing solutions and printing pastes used in the textile industry. These products are also effective against sulfate-reducing and iron bacteria.

As to the amount of the metal dithiocarbamates to be added to the aqueous system, a suitable quantity varies from about 0.01 to 10,000 parts per million parts of water. It will be understood, however, that larger quantities may be used with no detrimental effect, but such larger quantities increase the cost of operation with limited material benefit. When the products of this invention are used a nematocide, suitable quantities vary from about 0.1 to 20.0 pounds per acre. When used as soil fumigants, suitable quantities vary from 10 to 300 pounds per acre. As mentioned above, larger quantities may be used with no detrimental effect.

The various dithiocarbamates, aldehydes, and amines suitable for preparing the reaction products of our invention may vary to a considerable degree. Dithiocarbamates suitable must contain at least one free hydrogen atom on each nitrogen of the dithiocarbamate group. The dithiocarbamates must be water-soluble alkali-metal or alkaline earth metal salts. Examples of suitable compounds are the sodium and potassium salts of dithiocarbamic acid, the sodium and potassium salts of N-methyldithiocarbamic acid, N-ethyldithiocarbamic acid, N-propyldithiocarbamic acid, and N-butyldithiocarbamic acid, and the disodium and dipotassium salts of ethylenebisdithiocarbamic acid. Other alkylenebisdithiocarbamic acids may contain as the alkylene group the following:

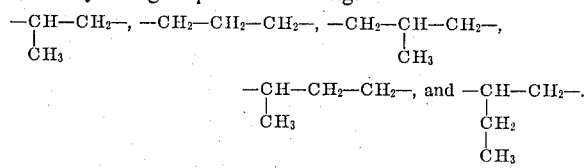

The water-soluble salts exemplified by methylammonium-N-methyldithiocarbamate are not suitable since it is well known that these compounds will react with formaldehyde to yield water-insoluble heterocyclic compounds.

Among the aldehydes suitable, formaldehyde is preferred by acetaldehyde and propionaldehyde may also be used. Ammonia, primary alkylamines, such as methylamine, ethylamine, n-propylamine, isopropylamine, n-butylamine, sec-butylamine, and isobutylamine are suitable amines but ammonia and methylamine are preferred. Primary alkylenediamines such as ethylenediamines, propylenediamines, and butylenediamines are also suitable.

In order to prepare less soluble solids from the reaction products for use in various industrial applications such as agricultural foliage fungicides in the form of suspensions or dusts, the water-soluble alkali-metal salts can be converted to the metallic salts, such as those of, for example, calcium, barium, manganese, iron, nickel, copper, and zinc.

We prefer to manufacture the products of our invention by first manufacturing the alkali-metal or alkaline-earth-metal salts of the dithiocarbamic acids and then adding the aldehyde followed by the amine. Satisfactory products are also obtained by adding the amine to the dithiocarbamate followed by the aldehyde or by mixing the amine and aldehyde and adding the mixture to the dithiocarbamate.

The reaction products of our invention are mixtures. Repeated attempts to isolate the products and identify these have failed because of the nature of the products. Alkali-metal salts of dithiocarbamic acids are extremely water soluble, are hygroscopic, are decomposed by acid and heat, and are subject to air oxidation when attempts are made to isolate the compounds. Some information on the nature of the products produced has been obtained, but we wish to emphasize that while the applicants do not wish to be bound by any theory as to the exact nature of reaction mechanism, it is believed that the following is substantially correct.

The chemical literature contains a number of references concerning the reactions of alkali-metal dithiocarbamates with aldehydes and amines or acid salts of amines producing what are reported to be esters of the dithiocarbamic acids.

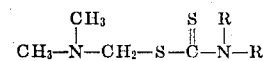

Thus, we were surprised to discover that when the reaction products of our invention were examined, we found essentially no esters. Since the esters are soluble in organic solvents, it was a simple matter to extract the reaction products with water-insoluble solvents to isolate the esters. The reactions of formaldehyde with the dithiocarbamates containing free hydrogen atoms on the nitrogen atom produced a large quantity of water-insoluble and organic-soluble solid. When one-half equivalent of primary amine was added, the amount of solid decreased but was still definitely present. When approximately the equivalent amount of ammonia or primary amine was used, the solutions were stable. None of the extremely small amounts of the organic-soluble materials isolated by extraction showed any appreciable activity against bacteria, whereas the aqueous solutions which were stable were much more active against microorganisms than the dithiocarbamate used in the reaction.

Since the products of our reactions were water soluble and occurred only when a free hydrogen atom was present, it seemed reasonable that the reaction had occurred on the nitrogen atom. Compounds isolated from the reaction products as described in the examples were analyzed and tested for microbiological activity. The products which were effective microbicides were dithiocarbamate salts and probably have a hydroxymethyl group or an aminomethyl group attached to the nitrogen. We have isolated compounds and mixtures of compounds from the reaction products for which nitrogen and sulfur analyses indicate both 1 to 1 and 1 to 2 ratios. We believe that the products of the invention are mixtures containing some or all of these structures as exemplified by the products resulting from the reaction of potassium N-methyldithiocarbamate with formaldehyde and monomethylamine.

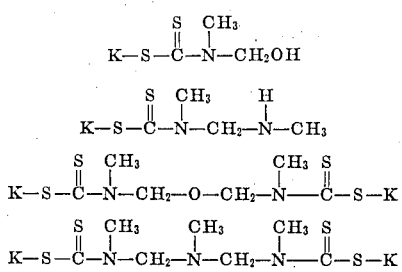

In order to disclose the nature of the invention still more clearly, the following illustrative examples will be given. It is understood, however, that the invention is not to be limited to the specific conditions or details set forth in these examples, except insofar as such limitations are specified in the appended claims.

EXAMPLE 1

Reaction of potassium N-methyldithiocarbamate with formaldehyde and methylamine

A. A 2-liter reaction flask fitted with a mechanical stirrer, condenser, and thermometer was charged with 88 grams of waters and 1,000 grams (3.7 moles) of an aqueous solution containing 54.5 percent of potassium N-methyldithiocarbamate and was treated with 302 grams (3.7 moles) of an aqueous solution containing 37 percent formaldehyde. The temperature rose from 25° to 30° C. After stirring for 30 minutes, 232 grams (3.7 moles) of an aqueous solution containing 50 percent of monomethylamine was added; the temperature was maintained at less than 35° C. with ice bath cooling. The reaction was agitated an additional 30 minutes.

B. The reaction described in Part (A) of this example was repeated using a ratio of one mole of potassium N-methyldithiocarbamate, one mole of formaldehyde, and one-half mole of monomethylamine. The product was a clear orange solution which began to precipitate crystalline solid after two days.

C. The reaction described in Part (A) of this example was repeated using a ratio of one mole of potassium N-methyldithiocarbamate, one mole of formaldehyde, and one-half mole of ethylenediamine. The product was a clear, orange, stable solution.

The products of this example were tested against Aerobacter aerogenes in comparison with potassium N-methyldithiocarbamate using the pulp-substrate procedure described in U.S. Pat. No. 2,881,070 at a pH of 5.5 and 6.5. The results are tabulated in Table 1.

Table 1

Percent kill of *Aerobacter aerogenes* in a pulp substrate at pH 5.5 and 6.5 after 18 hours contact

| Concentration based on active ingredients | pH | Potassium n-methyl dithio-carbamate | A | B | C |
|---|---|---|---|---|---|
| Parts per million | | | Percent kill | | |
| 0.25 | 5.5 | 11 | 99 | 100 | 0 |
| 0.50 | | 14 | 99.9 | 100 | 0 |
| 1.0 | | 18 | 93 | 100 | 75 |
| 2.0 | | 5 | 99.9 | 100 | 99.7 |
| 3.0 | | 29 | 99.9 | 100 | 99.9 |
| 4.0 | | 95 | 100 | 100 | 99.9 |
| 0.25 | 6.5 | 30 | 97 | — | — |
| 0.50 | | 5 | 99.9 | 99 | 21 |
| 1.0 | | 0 | 99.9 | 99.7 | 21 |
| 2.0 | | 3 | 99.9 | 99.99 | 91 |
| 3.0 | | 61 | 99.8 | 99.97 | 99 |
| 4.0 | | 86 | 99.8 | 99.7 | 99.6 |

EXAMPLE 2

Reaction of potassium N-methyldithiocarbamate with formaldehyde and methylamine

A. A 1-liter reaction flask fitted with a mechanical stirrer, condenser, and thermometer was charged with 500 grams (1.96 moles) of an aqueous solution containing 56.8 percent of potassium N-methyldithiocarbamate and treated at 25° C. with 158.6 grams (1.96 moles) of an aqueous solution containing 37 percent of formaldehyde; the temperature rose to 31° C. Agitation was continued for 1 hour and then 121.5 grams (1.96 moles) of an aqueous solution containing 50 percent monomethylamine was added over a 30-minute period, maintaining the temperature between 40° and 43° C. with water bath cooling. Agitation was continued for 1 hour.

A portion of the reaction mixture (300 grams) was agitated with 1,000 milliliters of acetone, yielding two layers. The botom layer, weighing 122 grams, was treated with 300 milliliters of acetone and then with anhydrous ethanol to give an orange solid. After filtration, the solid was dried over phosphorus pentoxide in a vacuum desiccator.

B. A second reaction similar to Part (A) of this example was run using a ratio of one mole of potassium N-methyldithiocarbamate, one mole of formaldehyde, and one-half mole of monomethylamine. The reaction was treated with acetone and ethanol as described in Part (A) and an orange solid was obtained.

The two solids were tested against Aerobacter aerogenes using the pulp-substrate method at a pH value of 5.5. The results are tabulated in Table 2.

Table 2

Percent kill of *Aerobacter aerogenes* in a pulp substrate at pH 5.5 after 18 hours contact.

| Concentration | A | B |
|---|---|---|
| Parts per million | Percent kill | |
| 0.2 | 13 | 99.8 |
| 0.5 | 44 | 100 |
| 1.0 | 99 | 100 |
| 2.0 | 99.99 | 100 |
| 4.0 | 99.9 | 100 |
| 6.0 | 99.9 | 100 |

EXAMPLE 3

Reaction of potassium N-methyldithiocarbamate, formaldehyde, and ammonia

Two reactions were run in a similar manner to those described in Example 2 using ratios of 1 to 1 to 0.33 and 1 to 1 to 0.66 of potassium N-methyldithiocarbamate, formaldehyde, and ammonia. The solutions were tested by the pulpsubstrate method against Aerobacter aerogenes at a pH value of 5.5. The results are tabulated in Table 3.

Table 3

Percent kill of *Aerobacter aerogenes* in a pulp substrate at pH 5.5 after 18 hours contact.

| Concentration based on active ingredients | 1:1:0.33 | 1:1:0.66 |
|---|---|---|
| Parts per million | Percent kill | |
| 0.2 | 99.6 | 99 |
| 0.5 | 99.8 | 99.6 |
| 1.0 | 100 | 100 |
| 2.0 | 99.9 | 99.97 |
| 4.0 | 100 | 100 |
| 6.0 | 100 | 100 |

EXAMPLE 4

Reaction of potassium ethylenebisdithiocarbamate with formaldehyde and methylamine An 8-ounce bottle was charged with 50 grams (0.035 mole) of an aqueous solution containing 20 percent potassium ethylenebisdithiocarbamate and was treated with 5.6 grams (0.069 mole) of an aqueous solution containing 37 percent of formaldehyde, then 2.2 grams (0.035 mole) of an aqueous solution containing 50 percent monomethylamine. The exothermic reaction cuased by the addition of the amine was brought quickly to room temperature by chilling in ice and the addition of 65.8 grams of water.

The clear orange solution was extracted with three 50-milliliter portions of methylene chloride to remove any esters of the dithiocarbamic acid. The extracts were dried over magnesium sulfate, filtered, and evaporated to give 2.1 grams cloudy, yellow, viscous liquid with amine odor.

The portion remaining after the methylene chloride extraction was treated with acetone to yield two layers. The oily bottom layer was washed with acetone two times, separated, and the oil treated with anhydrous ethanol to produce precipitation of a fine white solid. After filtration, the solid was dried over phosphorus pentoxide in a vacuum desiccator to give a white, hygroscopic, water-soluble powder.

The solid (A) was tested against Aerobacter aerogenes using the pulp-substrate method at a pH value of 5.5 in comparison with dipotassium ethylenebisdithiocarbamate (B). The results are tabulated in Table 4.

Table 4

Percent kill of *Aerobacter aerogenes* in a pulp substrate at pH 5.5 after 18 hours contact

| Concentration based on active ingredients | A | B |
|---|---|---|
| Parts per million | Percent kill | |
| 0.2 | 97 | — |
| 0.5 | 96 | 16 |
| 1.0 | 99 | 13 |
| 2.0 | 99 | 4 |
| 4.0 | 99 | 74 |
| 6.0 | 99.95 | 99 |

EXAMPLE 5

Isolation and testing of active ingredients

A reaction similar to that in Example 1(A) was run with 2,000 grams of 56-percent potassium N-methyldithiocarbamate, 634 grams of 37-percent formaldehyde, 486 grams of 50-percent monomethylamine, and 272 grams of water.

A rotating, vacuum evaporator was charged with 1,080 grams of the solution and heated at 50°–55° C. until constant weight was reached. The residue was a mixture of thick syrup and crystalline solid and weighed 459.6 grams (46.6 percent of the original weight). This residue was mixed with 300 milliliters of isopropanol and a solution containing crystalline solid was obtained. The mixture was filtered on a Buchner funnel and the solid washed with isopropanol and dried in a vacuum desiccator. The solid was slurried in 700 milliliters of ether and filtered. The solid, after drying, weighed 247 grams (A). The ether filtrate was evaporated and 7.4 grams of a liquid residue was obtained. Analysis of the solid for sulfur and nitrogen was not conclusive but the ratio of S to N was 1 to 1, indicating that reaction products of the dithiocarbamate, formaldehyde and monomethylamine had occurred. Efforts to separate this mixture and identify the components failed. The solid was shown to be a mixture of dithiocarbamic acid salts by the water solubility, presence of potassium (about 24 percent) and the infrared spectrum.

The combined isopropanol filtrate and washings precipitated 20 grams of solid on standing. The remaining isopropanol solution was evaporated to yield 174 grams of a thick yellow syrup. When the syrup was dissolved in 500 milliliters of methanol and the solution diluted with 1,000 milliliters of ether, 55 grams of white solid identical with the 20 grams already obtained was isolated after drying. This solid was designated (B) and was dried in a vacuum desiccator. Analysis of 23.3 percent potassium 36.5 percent sulfur, and 8.5 percent nitrogen as well as the infrared indicated that this was potassium N-hydroxymethyl-N-methyldithiocarbamate (Theory: K, 23.5; S, 38.7; N, 8.4.)

Compounds (A) and (B) were tested against Aerobacter aerogenes by the pulpsubstrate method at a pH value of 5.5 after 18 hours contact. The results are tabulated in Table 5.

Table 5

Percent kill of *Aerobacter aerogenes* in a pulp substrate at pH 5.5 after 18 hours contact.

| Concentration of solids | A | B |
|---|---|---|
| Parts per million | Percent kill | |
| 0.05 | 34 | 99.5 |
| 0.1 | 34 | 100 |
| 0.2 | 22 | 99.98 |
| 0.4 | 97 | 99.99 |
| 0.8 | 99.8 | 99.98 |
| 1.2 | 99.9 | 100 |

EXAMPLE 6

Inhibition of fungi by various products

Six solutions were prepared using the same procedure as described in Example 1. The reactants were as follows:

A. Equimolar quantities of potassium N-methyldithiocarbamate, formaldehyde, and monomethylamine.

B. One mole of potassium N-methyldithiocarbamate, treated with two moles of formaldehyde and two moles of monomethylamine.

C. One mole of potassium N-methyldithiocarbamate treated with three moles of formaldehyde and three moles of monomethylamine.

D. One mole of potassium ethylenebisdithiocarbamate treated with two moles of formaldehyde and two moles of monomethylamine.

E. One mole of potassium ethylenebisdithiocarbamate treated with four moles of formaldehyde and four moles of monomethylamine.

F. One mole of potassium ethylenebisdithiocarbamate treated with six moles of formaldehyde and six moles of monomethylamine.

These solutions were tested on an active ingredient basis against *Aspergillus niger*, *Penicillium roqueforti*, and *Chaetomium globosum* using the pulpsubstrate method described in U.S. Pat. No. 3,356,706. Active ingredients are calculated as the total amount of dithiocarbamate salt, formaldehyde, and monomethylamine. The period of observation was 7 days. Growth was recorded after this period on the basis of the following key:

4 = excellent
3 = good
2 = poor
1 = very poor, scant, questionable
0 = no growth The results are summarized in Table 6.

Table 6

Inhibition of *Aspergillus niger*, *Penicillium roqueforti*, and *Chaetomium globosum* by the compositions listed below in a pulp-substrate method after 7 days incubation.

| Fungus | Concentration | A | B | C | D | E | F |
|---|---|---|---|---|---|---|---|
| | Parts per million | | | Growth | | | |
| Aspergillus niger | 0 | 4 | 4 | 4 | 4 | 4 | 4 |
| | 1 | 4 | 4 | 4 | 4 | 4 | 4 |
| | 3 | 4 | 4 | 4 | 4 | 4 | 4 |
| | 5 | 4 | 4 | 4 | 4 | 4 | 4 |
| | 10 | 4 | 4 | 4 | 4 | 0 | 1 |
| | 15 | 0 | 1 | 0 | 3 | 0 | 0 |
| | 20 | 0 | 0 | 0 | 1 | 0 | 0 |
| | 25 | 0 | 0 | 0 | 0 | 0 | 0 |
| | 50 | 0 | 0 | 0 | 0 | 0 | 0 |
| Penicillium roqueforti | 0 | 4 | 4 | 4 | 4 | 4 | 4 |
| | 1 | 4 | 4 | 4 | 4 | 4 | 4 |
| | 3 | 4 | 4 | 4 | 4 | 4 | 4 |
| | 5 | 4 | 4 | 4 | 4 | 4 | 4 |
| | 10 | 4 | 4 | 4 | 4 | 4 | 4 |
| | 15 | 4 | 4 | 4 | 0 | 3 | 4 |
| | 20 | 1 | 4 | 4 | 0 | 0 | 0 |
| | 25 | 0 | 0 | 4 | 0 | 0 | 0 |
| | 50 | 0 | 0 | 0 | 0 | 0 | 0 |
| Chaetomium globosum | 0 | 4 | 4 | 4 | 4 | 4 | 4 |
| | 1 | 4 | 4 | 4 | 4 | 4 | 4 |
| | 3 | 4 | 4 | 4 | 4 | 4 | 4 |
| | 5 | 4 | 4 | 4 | 4 | 4 | 4 |
| | 10 | 4 | 4 | 4 | 4 | 4 | 0 |
| | 15 | 4 | 4 | 4 | 0 | 4 | 0 |
| | 20 | 4 | 4 | 4 | 0 | 0 | 0 |
| | 25 | 0 | 4 | 4 | 0 | 0 | 0 |
| | 50 | 0 | 0 | 0 | 0 | 0 | 0 |

EXAMPLE 7

Effectiveness against algae

An aqueous solution containing 35 percent of the reaction products of potassium N-methyldithiocarbamate, formaldehyde, and monomethylamine at a 1 to 1 to 1 molar ratio was used to determine the effectiveness against the four algae *Chlorella pyrenoidosa*, *Chlorococcum hypnosporum*, *Oscillatoria prolifera*, and *Phormidium inundatum* in Difco Algae Broth, having the formula:

| Compound | Grams per liter |
|---|---|
| Sodium nitrate | 1.000 |
| Ammonium chloride | 0.050 |
| Calcium chloride | 0.058 |
| Magnesium sulfate | 0.513 |
| Dipotassium phosphate | 0.25 |
| Ferric chloride | 0.003 |

Forty-gram portions of the algae medium were added to 250-milliliter Pyrex Erlenmeyer flasks fitted with loose metal caps and then sterilized. Each of the following substances was then added to the flasks in the order listed:

1. Sterile algae medium as required in each individual case to bring the total weight of the contents of each flask to 50 grams, after allowing for all subsequent additions specified hereinafter.

2. Solution of toxicant or control agent to be evaluated in each test, to give the concentration desired in parts per million by weight.

3. *Chlorella pyrenoidosa*, *Chlorococcum hypnosporum*, *Oscillatoria prolifera*, and *Phormidium inundatum* are the algae used for these tests. The inoculum was an amount sufficient to give excellent growth in the controls after 14 days. This was achieved by adding 1 milliliter of a 14-day-old culture having luxuriant growth. The *Chlorella pyrenoidosa* culture was obtained from American Type Culture Collection No. 7516; *chlorococcum hypnosporum*, Starr No. 119, and *Oscillatoria prolifera*, Starr No. 1270, were obtained from the Culture Collection of Algae at Indiana University; *Phormidium inundatum*, Wisconsin No. 1093, was obtained from the University of Washington.

After the inoculum of the test algae had been added, the flasks were allowed to incubate at temperature 28°±2° c. under fluorescent illumination of 250 foot-candle intensity (8 hours, 16 hours darkness) for a period adequate for growth in the controls (those portions of medium which contained no toxicant). Observations of growth were made at 7-day intervals on the basis of the following key:

4 = excellent

3 = good

2 = poor

1 = very poor, scant, questionable

0 = no growth

The results are summarized in Table 7.

Table 7

Inhibition of *Chlorella pyrenoidosa, Chlorococcum hypnosporum, Oscillatoria prolifera,* and *Phormidium inundatum* by the reaction products of potassium N-methyldithiocarbamate, formaldehyde, and monomethylamine after 21 days.

| Concentration of solution | Chlorella pyrenoidosa | Chlorococcum hypnosporum | Phormidium inundatum | Oscillatoria prolifera |
|---|---|---|---|---|
| ppm | | | | |
| 0 | 4 | 4 | 4 | 4 |
| 1 | 4 | 4 | 4 | 4 |
| 5 | 4 | 3 | 4 | 3 |
| 10 | 2 | 1 | 4 | 3 |
| 25 | 0 | 0 | 0 | 1 |
| 50 | 0 | 0 | 0 | 0 |
| 75 | 0 | 0 | 0 | 0 |
| 100 | 0 | 0 | 0 | 0 |

EXAMPLE 8

Effectiveness against nematodes

A solution containing 42.5 percent of the reaction products of potassium N-methyldithiocarbamate, formaldehyde, and monomethylamine at a 1 to 1 to 1 molar ratio was used to determine effectiveness against the root-knot nematode, *Meloidogyne incognita acrita*.

For this test, a composted greenhouse soil heavily infested with the nematode was obtained by growing tomato plants having galled roots in the soil for 6 to 8 weeks. Twenty-five gram portions of soil were weighed, transferred into small bottles, and treated with calculated amounts of the dithiocarbamate solution.

After treatment, the bottles were capped and allowed to stand for 24 hours at room temperature. The soil was then transferred onto gauze pads which were placed in plugged funnels. Tap water was added until the soil was barely submerged. After 24 hours, about 15 to 25 milliliters of the water was allowed to drain from the funnel and the water was examined under a steromicroscope for live nematodes. The results are summarized in Table 8.

Table 8

Effectiveness of the product of Example 8 as a nematocide.

| Concentration of active ingredient | Live nematodes per stereomicroscope field |
|---|---|
| Pounds per acre | |
| 0 | 125 |
| 1 | 11 |
| 2 | 48 |
| 3 | 21 |
| 4 | 22 |
| 5 | 25 |
| 10 | 0 |

Another test using a sodium N-methyldithiocarbamate nematocide at 3 pounds of active ingredient per acre showed 77 live nematodes in the steromicroscope field.

EXAMPLE 9

Effectiveness in latex resins, paints, and hydroxyethyl cellulose solutions

A solution of the reaction products from potassium N-methyldithiocarbamate, formaldehyde, and monomethylamine at 1 to 1 to 1 molar ratio containing 35 percent of active ingredients, was tested as a preservative for a polyvinyl acetate resin, a paint made from the resin and a hydroxyethyl cellulose solution.

In these tests, the substrate to be preserved was treated with the dithiocarbamate solution at various levels and the mixture allowed to stand for 24 hours. The mixtures were then inoculated with a Pseudomonas culture, a Bacillus culture, and a green mold isolated from spoiled paints. After 24 hours, 72 hours, and 1 week, samples were streaked on nutrient agar or mycophil agar plates to determine if viable organisms were still present. The test solutions were reinoculated after two weeks and plates were streaked again after 72 hours.

The dithiocarbamate solution preserved a polyvinyl acetate resin at pH 8.8 at a concentration of 0.05 percent using the Pseudomonas culture. The same concentration was also effective in a paint prepared from the polyvinyl acetate resin. The pH of the paint was 8.9.

With a hydroxyethyl cellulose solution at pH 7, the dithiocarbamate solution was effective at 0.10 percent in the pseudomonas inoculated solution and at 0.05 percent in the Bacillus and green mold inoculated solutions. With the same hydroxyethyl cellulose solution buffered to pH 9.2, the dithiocarbamate solution was effective at 0.05, 0.10, and 0.05 percent, respectively, in the Pseudomonas, Bacillus, and green mold inoculated systems.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. The compound potassium N-hydroxymethyl-N-methyldithiocarbamate.

\* \* \* \* \*